(12) United States Patent
Ichikawa (10) Patent No.: US 10,454,129 B2
(45) Date of Patent: Oct. 22, 2019

(54) SECONDARY BATTERY

(71) Applicant: NEC ENERGY DEVICES, LTD., Sagamihara-shi, Kanagawa (JP)

(72) Inventor: Tomoyuki Ichikawa, Kanagawa (JP)

(73) Assignee: Envision AESC Energy Devices Ltd., Sagamihara-shi, Kanagawa (JP)

( * ) Notice: Subject to any disclaimer, the term of this patent is extended or adjusted under 35 U.S.C. 154(b) by 465 days.

(21) Appl. No.: 15/300,627

(22) PCT Filed: Feb. 6, 2015

(86) PCT No.: PCT/JP2015/053361
§ 371 (c)(1),
(2) Date: Sep. 29, 2016

(87) PCT Pub. No.: WO2015/151580
PCT Pub. Date: Oct. 8, 2015

(65) Prior Publication Data
US 2017/0117572 A1    Apr. 27, 2017

(30) Foreign Application Priority Data
Mar. 31, 2014  (JP) ................................ 2014-071718

(51) Int. Cl.
*H01M 10/04* (2006.01)
*H01M 2/02* (2006.01)
*H01M 10/0585* (2010.01)

(52) U.S. Cl.
CPC ......... *H01M 10/045* (2013.01); *H01M 2/021* (2013.01); *H01M 2/024* (2013.01);
(Continued)

(58) Field of Classification Search
None
See application file for complete search history.

(56) References Cited

U.S. PATENT DOCUMENTS

2003/0148173 A1*  8/2003  Gu ...................... H01M 2/0212
429/62
2010/0047685 A1  2/2010  Lee et al.
(Continued)

FOREIGN PATENT DOCUMENTS

CN    1716658 A    1/2006
CN    102044692 A    5/2011
(Continued)

OTHER PUBLICATIONS

International Search Report of PCT/JP2015/053361, dated Apr. 14, 2015. [PCT/ISA/210].
(Continued)

*Primary Examiner* — Eli S Mekhlin
(74) *Attorney, Agent, or Firm* — Sughrue Mion, PLLC (57) ABSTRACT

Secondary battery 1 includes: battery electrode assembly 5 that has a quadrangular planar shape, and includes a positive electrode and a negative electrode laminated with a separator interposed therebetween; and an exterior container that is formed of flexible films 7, and contains battery electrode assembly 5. The exterior container has recessed emboss portion 8 that contains battery electrode assembly 5 therein. Four corners 4a of an outer peripheral portion of battery electrode assembly 5 are either folded to be contained inside emboss portion 8, or inserted between flexible films 7 outside emboss portion 8. A length of at least one side among four sides forming the quadrangular planar shape of battery electrode assembly 5 is shorter than an inner dimension of emboss portion 8 in the direction in which the one side extends.

6 Claims, 10 Drawing Sheets

(52) U.S. Cl.
CPC ....... *H01M 2/0267* (2013.01); *H01M 2/0275* (2013.01); *H01M 2/0287* (2013.01); *H01M 10/0413* (2013.01); *H01M 10/0436* (2013.01); *H01M 10/0468* (2013.01); *H01M 10/0585* (2013.01)

(56) References Cited

U.S. PATENT DOCUMENTS

| 2011/0064991 | A1 | 3/2011 | Ahn |
| 2011/0151307 | A1* | 6/2011 | Hwang .................. H01M 2/021 429/129 |
| 2013/0084484 | A1 | 4/2013 | Shinyashiki et al. |

FOREIGN PATENT DOCUMENTS

| JP | 2007-87652 A | 4/2007 |
| JP | 2008-47397 A | 2/2008 |
| JP | 2010-501981 A | 1/2010 |
| JP | 2011-65996 A | 3/2011 |
| JP | 2011-210500 A | 10/2011 |
| JP | 5103822 B2 | 12/2012 |
| JP | 2013-77447 A | 4/2013 |
| JP | 2013-140825 A | 7/2013 |
| JP | 2013-161631 A | 8/2013 |
| JP | 2013-161684 A | 8/2013 |
| JP | 2014-175247 A | 9/2014 |
| WO | 2005/036674 A1 | 4/2005 |

OTHER PUBLICATIONS

Communication dated Oct. 15, 2018 from the State Intellectual Property Office of the P.R.C. in counterpart Application No. 201580018123.0.

* cited by examiner

SECONDARY BATTERY

CROSS REFERENCE TO RELATED APPLICATIONS

This application is a National Stage of International Application No. PCT/JP2015/053361 filed Feb. 6, 2015, claiming priority based on Japanese Patent Application No. 2014-071718, filed Mar. 31, 2014, the contents of all of which are incorporated herein by reference in their entirety.

TECHNICAL FIELD

The present invention relates to a secondary battery.

BACKGROUND ART

Secondary batteries are becoming widely used as power supplies for vehicles and household appliances, not just as power supplies for portable devices such as mobile phones, digital cameras and laptop computers. From among the different kinds of secondary batteries, lithium ion secondary batteries, which have a high-energy density and are light-weight, are energy storage devices that have become essential in daily life. A laminated secondary battery has a battery electrode assembly having a structure in which positive electrode sheets and negative electrode sheets are alternately laminated with separators interposed therebetween. This battery electrode assembly and electrolyte are contained in an exterior container.

As the exterior container, there is a container formed by bonding flexible laminate films. For example, in a state where a recessed emboss portion that is to contain a battery electrode assembly is formed at a position where a pair of laminate films are opposite to each other, and in which the battery electrode assembly is contained in the emboss portion, outer peripheral portions of the laminate films are bonded to each other so that they are sealed. Additionally, in a configuration in which one long laminate film is doubled over to form an exterior container, an emboss portion is formed on a portion on end sides of a bent portion, and both portions are bonded to each other so that they are sealed in a state where a battery electrode assembly is contained in the emboss portion.

In the configuration in which the exterior container of the secondary battery is thus formed of flexible laminate films, there is a problem that mechanical strength is weak. Additionally, when the battery electrode assembly moves in the emboss portion, respective layers (positive electrodes, negative electrodes, separators) configuring the battery electrode assembly may be damaged so that they become deformed, and an electrical short-circuit between the positive electrodes and the negative electrodes may be caused.

Patent Document 1 discloses a configuration in which the longitudinal dimensions of the separators of the rectangular battery electrode assembly are larger than the inner longitudinal dimension of the emboss portion (rectangular containing portion) containing the battery electrode assembly, and the transverse dimensions of the separators are larger than the inner transverse dimension of the emboss portion. In this configuration, portions that protrude outside the emboss portion of the outer peripheral portions of the separators are curved or bent so that they are contained in the emboss portions.

PRIOR ART DOCUMENT

Patent Document

Patent Document 1: JP5103822B

SUMMARY OF INVENTION

Problem to be Solved by the Invention

In the configuration described in Patent Document 1, curving work or bending work need to be performed over the whole outer peripheral portions of the separators in order to contain the outer peripheral portions in the emboss portion, and the manufacturing step is complicated. Additionally, curved or bent portions of the outer peripheral portions of the separators are disposed in gaps between the outer peripheral portion of the battery electrode assembly and the inner peripheral portion of the emboss portion, and therefore the size of the region that will contain electrolyte becomes smaller, and thus a sufficient amount of electrolyte may not be contained in the smaller region. When the electrolyte is injected, the curved or bent portions of the outer peripheral portions of the separators may become resistant, and smooth injection may become difficult.

An object of the present invention is to provide a secondary battery capable of ensuring high reliability of an exterior container, and suppressing damage and deformation of a battery electrode assembly while holding a sufficient electrolyte.

Means to Solve the Problem

A secondary battery of the present invention includes: a battery electrode assembly that has a quadrangular planar shape, and includes a positive electrode and a negative electrode laminated with a separator interposed therebetween; and an exterior container that is formed of flexible films, and contains the battery electrode assembly. The exterior container has a recessed emboss portion that contains the battery electrode assembly therein. Four corners of an outer peripheral portion of the battery electrode assembly are either folded to be contained inside the emboss portion, or inserted between the flexible films outside the emboss portion. A length of at least one side from among four sides forming the quadrangular planar shape of the battery electrode assembly is shorter than an inner dimension of the emboss portion in a direction in which the one side extends.

Advantageous Effects of Invention

According to the present invention, it is possible to reduce movement of a battery electrode assembly to reduce damage and deformation, and it is possible to satisfactorily inject and hold an electrolyte without complicating the manufacturing step and without increasing the size of a battery.

EXEMPLARY EMBODIMENTS OF THE INVENTION

Hereinafter, exemplary embodiments of the present invention will be described with reference to the drawings.
[First Exemplary Embodiment]

Figure 1:
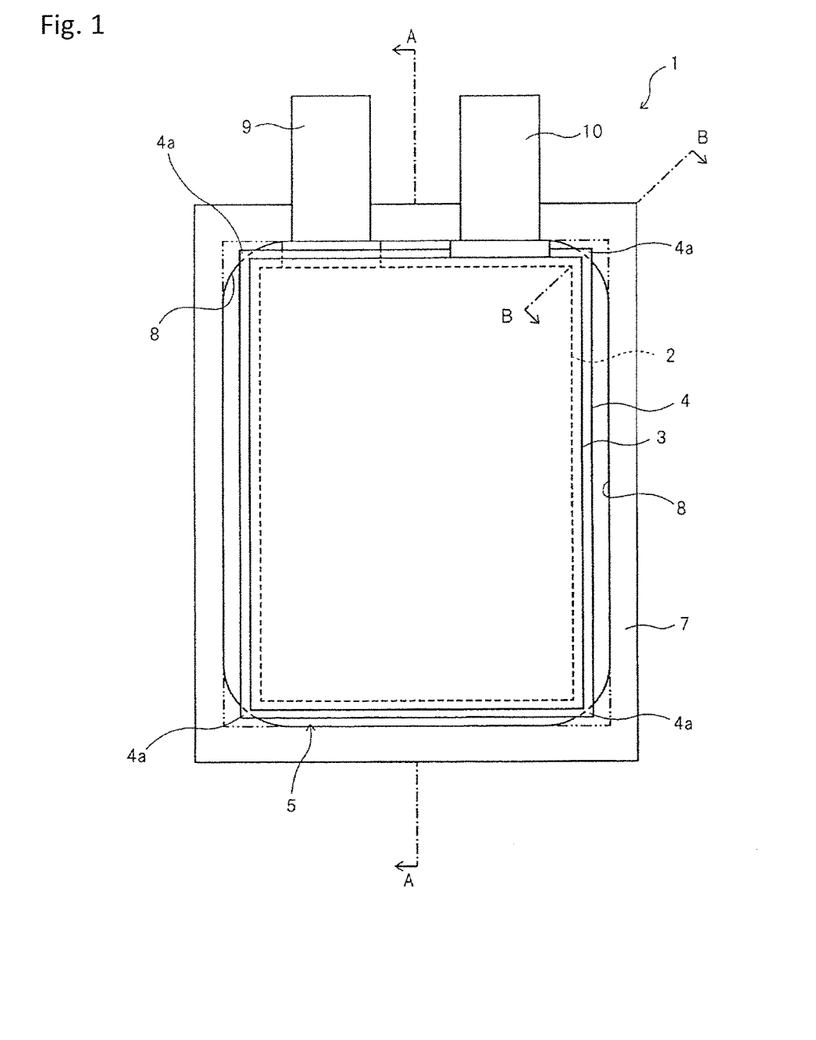
FIG. 1 is a plan view of a partially omitted exterior container of a secondary battery of a first exemplary embodiment of the present invention.
Figure 2:
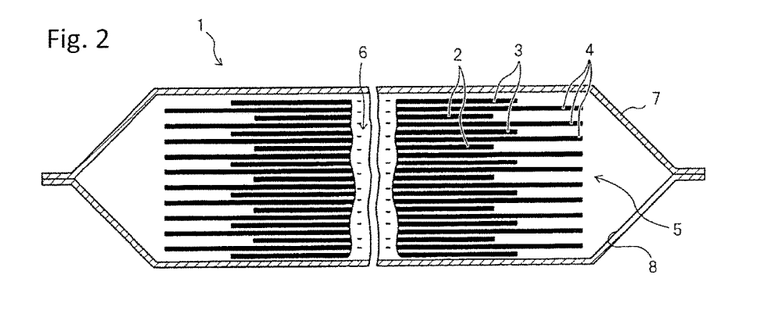
FIG. 2 is a cross-sectional view taken along line A-A in FIG. 1.
Figure 3:
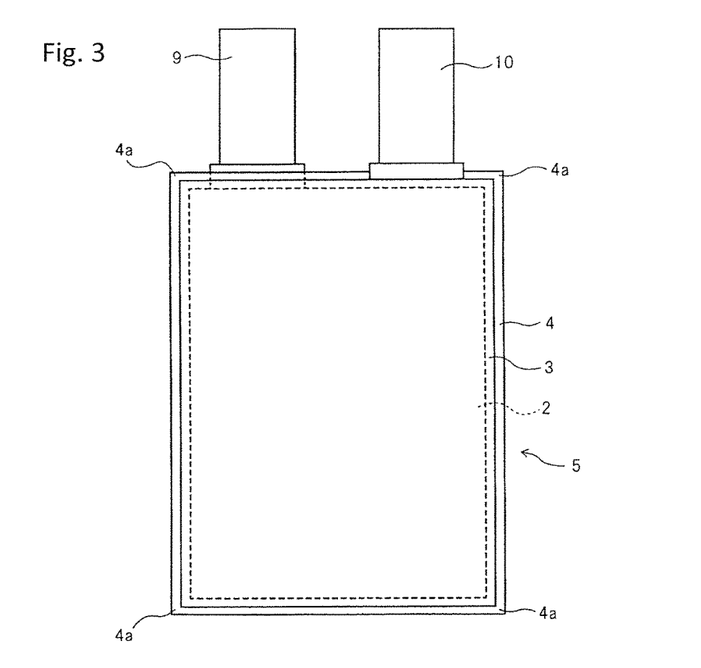
FIG. 3 is a plan view of a battery electrode assembly of the secondary battery illustrated in FIGS. 1 and 2.
Figure 4:
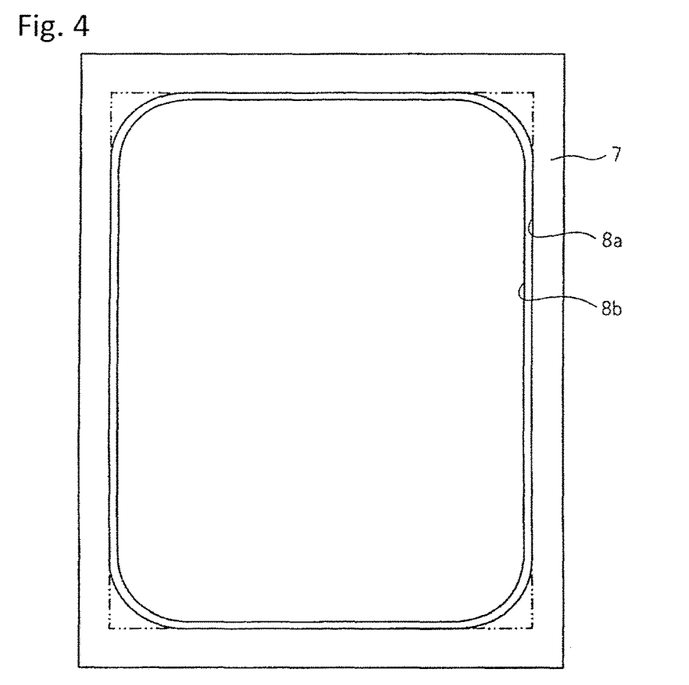
FIG. 4 is a plan view of one of flexible films forming the exterior container of the secondary battery illustrated in FIGS. 1 and 2.

FIGS. 1 and 2 illustrate a basic configuration of laminated secondary battery 1. FIG. 3 illustrates battery electrode assembly 5 of secondary battery 1. FIG. 4 illustrates flexible film 7 that forms an exterior container of secondary battery 1. Secondary battery 1 includes electrode laminate (battery electrode assembly) 5 (see FIG. 3) that includes positive electrodes (positive electrode sheets) 2 and negative electrodes (negative electrode sheets) 3 alternately laminated with separators 20 interposed therebetween. Battery electrode assembly 5 and electrolyte 6 are contained in an exterior container formed of flexible films 7. Positive electrode terminal 9 and negative electrode terminal 10 are drawn out to the outside of flexible films 7 from positive electrodes 2 and negative electrodes 3 of battery electrode assembly 5, respectively. FIG. 2 illustrates electrolyte 6 by omitting an intermediate portion of battery electrode assembly 5. Positive electrodes 2 each include a positive electrode current collector, and positive electrode active material layers formed on both surfaces of the positive electrode current collector, and negative electrodes 3 each include a negative electrode current collector, and negative electrode active material layers formed on both surfaces of the negative electrode current collector. The outer shape of each negative electrode 3 is larger than the outer shape of each positive electrode 2, and is smaller than the outer shape of each separator 4. FIG. 1 illustrates the inside of a partially omitted exterior container (flexible film 7 on an upper side is omitted).

The exterior container is preferably formed of flexible films 7, from the point of view of reducing battery weight. As flexible films 7, a film in which resin layers are provided on both front and rear surfaces of a metal layer as a base material can be used. As the metal layer, a layer having barrier properties which may be properties for preventing leakage of electrolyte 6 and infiltration of moisture from the outside can be selected, and aluminum, stainless steel or the like can be used. A thermally-fusible resin layer such as modified polyolefin is provided on at least one surface of the metal layer. The thermally-fusible resin layers of flexible films 7 are opposite to each other and are thermally fused at a part surrounding a containing space for battery electrode assembly 5, thereby the exterior container is formed (a part of an outline of a thermally fused portion is illustrated by a two-dot chain line in the drawing). A resin layer such as a nylon film and a polyester film may be provided on the surface of the exterior container opposite to the surface on which the thermally-fusible resin layer is formed.

Battery electrode assembly 5 of this exemplary embodiment has a quadrangular planar shape, and has a certain degree of thickness. In order to easily and reliably contain battery electrode assembly 5, recessed emboss portion 8 is previously formed in flexible film 7 that forms the exterior container. Battery electrode assembly 5 is inserted into emboss portion 8, so that battery electrode assembly 5 is stably held.

The size of emboss portion 8 and the size of battery electrode assembly 5 will be considered. When emboss portion 8 is larger than battery electrode assembly 5, it is easy to insert the battery electrode assembly, but play is generated between an inner peripheral portion of emboss portion 8 and an outer peripheral portion of battery electrode assembly 5, so that battery electrode assembly 5 is movable inside emboss portion 8. When battery electrode assembly 5 moves or vibrates inside emboss portion 8 due to impact or the like from the outside an edge portion, in particular, may be damaged or deformed. As a result, an electrical short-circuit between positive electrodes 2 and negative electrodes 3 may be caused.

Figure 5A:
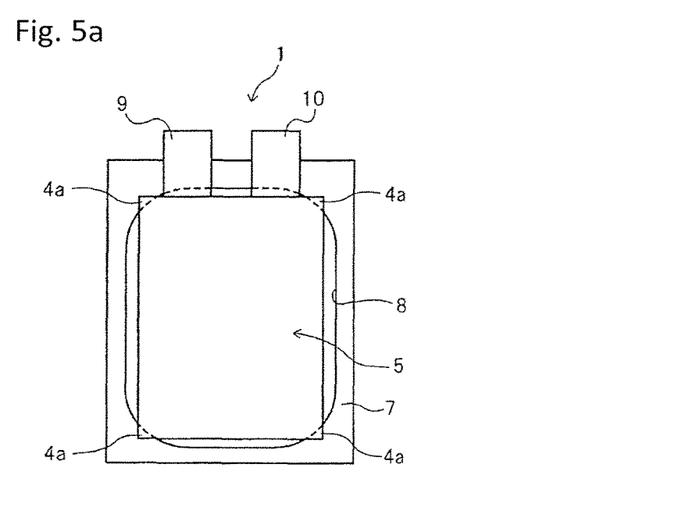
FIG. 5a is a plan view of simplified FIG. 1.
Figure 5B:
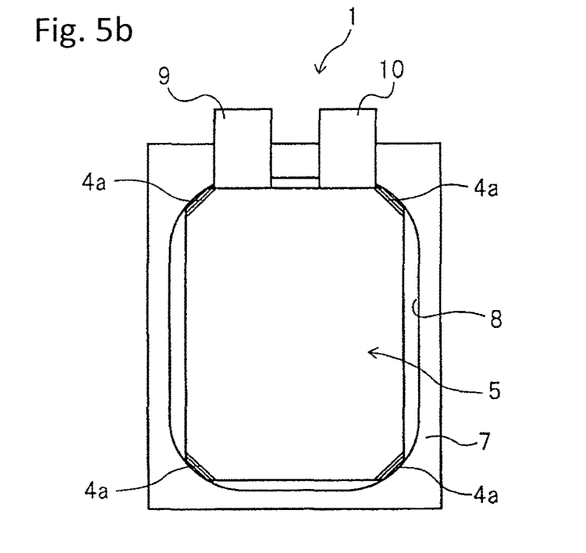
FIG. 5b is a plan view schematically illustrating a state where four corners of the battery electrode assembly of the secondary battery illustrated in FIG. 5a are folded to be contained in an emboss portion.

In this exemplary embodiment, as illustrated in FIG. 1, battery electrode assembly 5 whose planar shape is quadrangle is formed to have such a size that the four corners protrude from emboss portion 8. FIG. 5a is a schematic diagram of simplified FIG. 1, and, in particular, illustrates simplified battery electrode assembly 5. As described above, the outer shapes of separators 4 are the largest in battery electrode assembly 5, and therefore the four corners of battery electrode assembly 5 mentioned herein are four corners 4a of each separator 4. In this exemplary embodiment, as illustrated in FIG. 5b, four corners 4a that protrude from emboss portion 8 are folded, and battery electrode assembly 5 is then contained in emboss portion 8. According to this configuration, the folded portions (four corners 4a) abut on the inner peripheral surface of emboss portion 8. When these folded portions (four corners 4a) are in an elastically deformable state, the folded portions act like springs. That is, battery electrode assembly 5 is held in a state similar to a state where the four corners are supported by springs, and movement inside emboss portion 8 is reduced. Even when battery electrode assembly 5 moves inside emboss portion 8, battery electrode assembly 5 does not collide with the inner peripheral surface of emboss portion 8 with a large impact, and spring-like four corners 4a absorb the impact. Therefore, damage to battery electrode assembly 5, or deformation of parts other than four corners 4a is reduced, a short circuit between positive electrodes 2 and negative electrodes 3 is not caused. A part other than four corners 4a of battery electrode assembly 5 is located such that there is a gap between the part other than four corners 4a of battery electrode assembly 5 and the inner peripheral surface of emboss portion 8. That is, in this exemplary embodiment, only four corners 4a of battery electrode assembly 5 are folded to abut on the inner peripheral surface of emboss portion 8, and the parts other than four corners 4a are not folded, do not abut on the inner peripheral surface of emboss portion 8, and have gaps with an emboss surface. The "fold" mentioned in this specification is not limited to a case of bending while forming a clear crease, but includes a case of gentle curving.

Figure 6A:
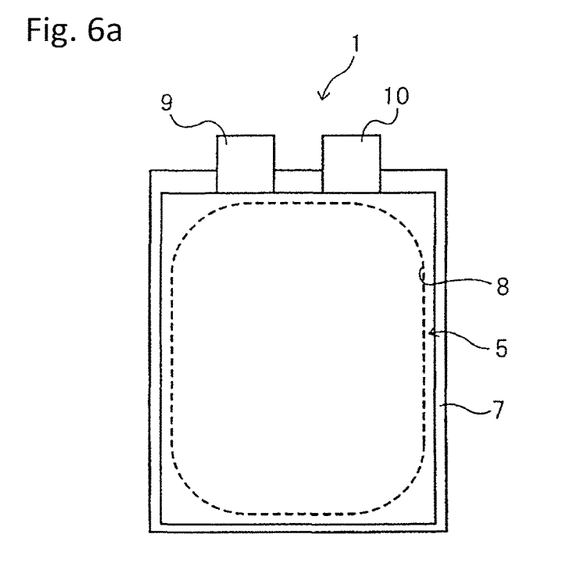
FIG. 6a is a plan view schematically illustrating a partially omitted secondary battery of a related art.
Figure 6B:
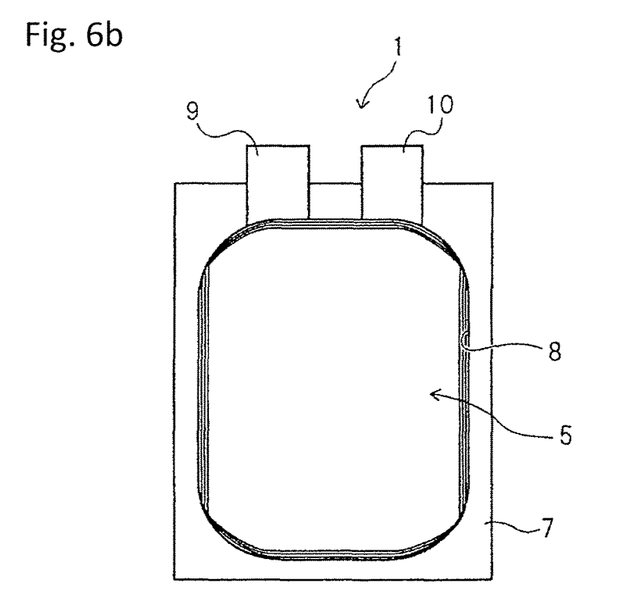
FIG. 6b is a plan view schematically illustrating a state where an outer peripheral portion of the battery electrode assembly of the secondary battery illustrated in FIG. 6a is folded to be contained in the emboss portion.

In a case where the whole outer peripheral portion of battery electrode assembly 5 protrudes to the outside of emboss portion 8 as in the case of the configuration of Patent Document 1, as illustrated in FIG. 6a, the whole outer peripheral portion of battery electrode assembly 5 needs to be folded to be contained in emboss portion 8, as illustrated in FIG. 6b. In this case, while an effect of reducing movement of battery electrode assembly 5 inside emboss portion 8 is obtained, folding work of all the four sides of the quadrangle is complicated. The whole outer peripheral portion of battery electrode assembly 5 abuts on the inner peripheral surface of emboss portion 8 with no gap. The folded parts of the outer peripheral portion of battery electrode assembly 5 occupy a large space inside emboss portion 8. Therefore, the space for holding an electrolyte is small, and thus a sufficient amount of electrolyte may not be able to be held. Additionally, the folded part of the outer peripheral portion of battery electrode assembly 5 becomes resistant when electrolyte is injected, and therefore it is difficult to smoothly inject the electrolyte into the exterior container. Thus, workability is deteriorated, and the electrolyte may not be satisfactorily injected and held.

On the other hand, in this exemplary embodiment, as illustrated in FIGS. 5a and 5b, folded parts in the outer peripheral portion of battery electrode assembly 5 are only four corners 4a, and therefore work for folding and containing inside emboss portion 8 is easy in addition to obtaining the effect of reducing movement of battery electrode assembly 5 inside emboss portion 8. Additionally, a part which may become resistant when electrolyte 6 is injected is very small in emboss portion 8, and the electrolyte is smoothly injected. The gaps are formed between the parts other than four corners 4a of battery electrode assembly 5 and the inner peripheral portion of emboss portion 8, and therefore it is possible to hold a sufficiently amount of electrolyte. Thus, in this exemplary embodiment, excellent workability, ease of electrolyte injection and holding a sufficiently amount of electrolyte are simultaneously obtained. Four corners 4a of battery electrode assembly 5 can be formed so as to be located outside the emboss portion, by, for example, forming four corners 4a of emboss portion 5 in a round curved shape while four corners 4a of battery electrode assembly 5 have right angle.

Figure 7:
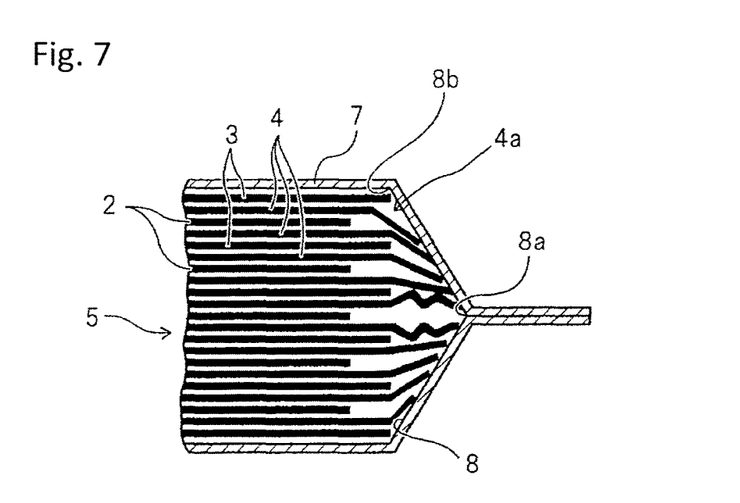
FIG. 7 is a cross-sectional view illustrating an example of a cross-section taken along line B-B in FIG. 1.
Figure 8:
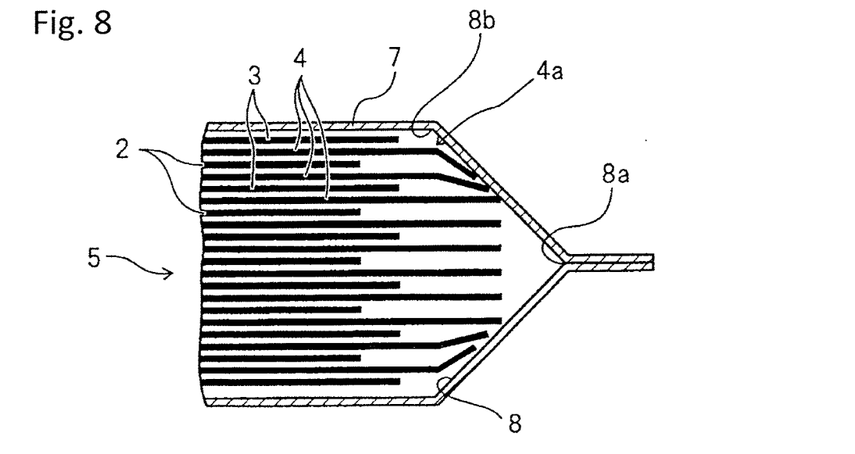
FIG. 8 is a cross-sectional view illustrating another example of the cross-section taken along line B-B in FIG. 1.

Recessed emboss portion 8 may have an enlarged shape in which the area is gradually increased toward opening 8a from bottom surface 8b illustrated in FIGS. 4, 7 and 8, clearly illustrated in FIG. 2. In this case, opening 8a is larger than bottom surface 8b. Therefore, a case where four corners 4a of separator 4 which is the largest in battery electrode assembly 5 is larger than opening 8a of emboss portion 8 and protrude as illustrated in FIG. 7, and a case where four corners 4a of separator 4 which is the largest in battery electrode assembly 5 is smaller than opening 8a of emboss portion 8, but is larger than bottom surface 8b as illustrated in FIG. 8 are considered, and the present invention includes both cases. In the case of the configuration illustrated in FIG. 7, the folding amount of four corners 4a is large, and in the case of the configuration illustrated in FIG. 8, the folding amount of four corners 4a is small. In both cases of the configuration illustrated in FIG. 7 and the configuration illustrated in FIG. 8, at least the positive electrode active material layers of positive electrodes 2 and at least the negative electrode active material layers of negative electrodes 3 are preferably smaller than bottom surface 8b of emboss portion 8, and preferably do not protrude to the outside. This is because when the positive electrode active material layers and the negative electrode active material layers are bent, these layers are damaged, and their function as electrodes of the secondary battery may be impaired.

A configuration in which four corners 4a of each separator 4 of battery electrode assembly 5 is smaller than both opening 8a and bottom surface 8b of emboss portion 8 is outside the scope of the present invention.

The exterior container may have a configuration in which two flexible films 7 are bonded, or may have a configuration in which one long flexible film 7 is doubled over. Emboss portion 8 may be formed on both an upper part and a lower part of the exterior container, or may be formed on only one side (only upper side, for example).

(Modification)

A modification of this exemplary embodiment does not comprises a configuration in which four corners 4a of each separator 4 of battery electrode assembly 5 are folded as described above. In the modification, four corners 4a protrude to the outside of emboss portion 8, and four corners 4a are inserted between flexible films 7 outside emboss portion 8, as illustrated in FIG. 5a. When flexible films 7 are bonded, four corners 4a are also fixed, and therefore battery electrode assembly 5 is fixed so that it cannot move.

In a case where the whole outer peripheral portion of battery electrode assembly 5 protrudes to the outside of emboss portion 8 as in the case of the configuration of Patent Document 1, as illustrated in FIG. 6a, the whole outer peripheral portion of the battery electrode assembly is inserted between flexible films 7. Therefore, the effect of reducing movement of battery electrode assembly 5 inside emboss portion 8 is high. However, the outer peripheral portions of flexible films 7 are bonded with the whole outer peripheral portion of battery electrode assembly 5 sandwiched therebetween, and therefore the bonding strength is low, and sealing reliability is low. In order to prevent the above, it is necessary to increase the size and increase the bonding strength of the bonding portion of flexible films 7. However, when the bonding portion is increased, the outer shape of an exterior container is increased, and an increase in the volume of a battery is caused, and therefore any increase in size of the bonding portion is not preferable.

On the other hand, in this modification, parts inserted between flexible films 7 are small parts, only four corners 4a. In addition, corners outside emboss portion 8 are parts that easily obtain a large bonding area of flexible films 7. Therefore, even when size is not increased as a whole, the bonding strength of flexible films 7 is not lowered. Consequently, an increase in the size of the battery is not caused.

Thus, according to the configuration, in which only four corners 4a of battery electrode assembly 5 protrude to the outside of emboss portion 8, of this exemplary embodiment, four corners 4a of battery electrode assembly 5 are not folded but are inserted between flexible films 7, so that it is possible to prevent movement of battery electrode assembly 5 and reduce damage and deformation. Furthermore, a manufacturing step of the secondary battery is not complicated, reliability of bonding of flexible films 7 is maintained, and an increase in size of the secondary battery is not caused.

[Second Exemplary Embodiment]

Figure 9A:
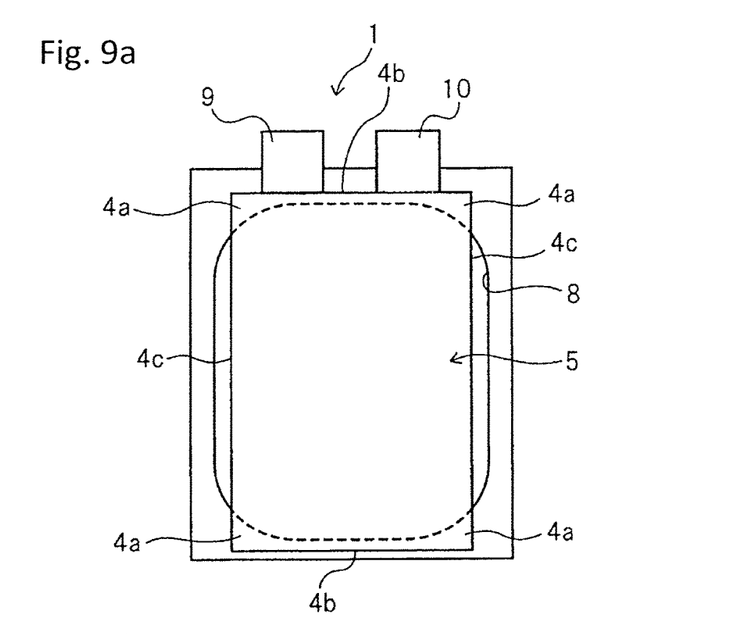
FIG. 9a is a plan view schematically illustrating a partially omitted secondary battery of a second exemplary embodiment of the present invention.
Figure 9B:
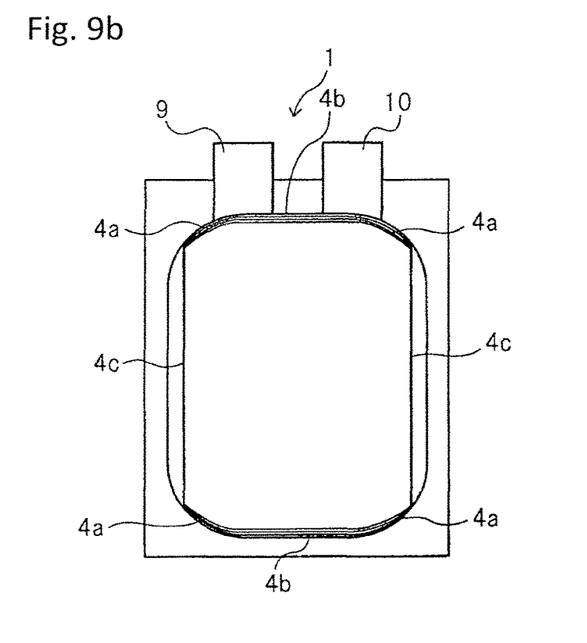
FIG. 9b is a plan view schematically illustrating a state where an outer peripheral portion of the battery electrode assembly of the secondary battery illustrated in FIG. 9a is folded to be contained in an emboss portion.

FIGS. 9a and 9b each illustrate a secondary battery of a second exemplary embodiment of the present invention. In this exemplary embodiment, as illustrated in FIG. 9a, four corners 4a of battery electrode assembly 5 protrude to the outside of emboss portion 8, and furthermore, battery electrode assembly 5 protrudes to the outside of emboss portion 8 in the longitudinal direction (vertical direction in FIGS. 9a and 9b). That is, longitudinal two sides 4c of battery electrode assembly 5 are longer than the longitudinal length of emboss portion 8. However, lateral two sides 4b of battery electrode assembly 5 are shorter than the lateral length of emboss portion 8. In this configuration, as illustrated in FIG. 9b, in addition to four corners 4a, lateral two sides 4b are also folded to be inserted into emboss portion 8. However, gaps exist between longitudinal sides 4c and an inner peripheral portion of emboss portion 8, and therefore electrolyte can be satisfactorily injected and held with the gaps. The effect of preventing movement of battery electrode assembly 5 (particularly, in the longitudinal direction) is high. As in the case of the first exemplary embodiment, positive electrodes 2 and negative electrodes 3 are small enough not to protrude to the outside of emboss portion 8, and therefore even when sides 4b of each separator 4 are folded, positive electrode terminal 9 and negative electrode terminal 10 are not affected.

[Third Exemplary Embodiment]

Figure 10A:
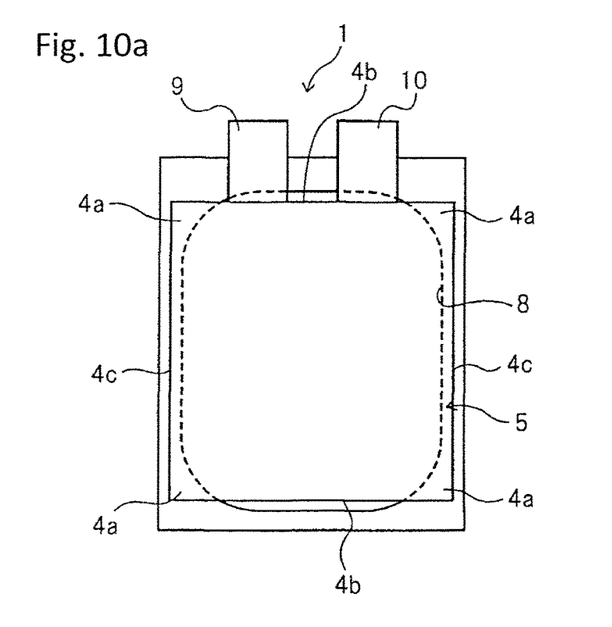
FIG. 10a is a plan view schematically illustrating a partially omitted secondary battery of a third exemplary embodiment of the present invention.
Figure 10B:
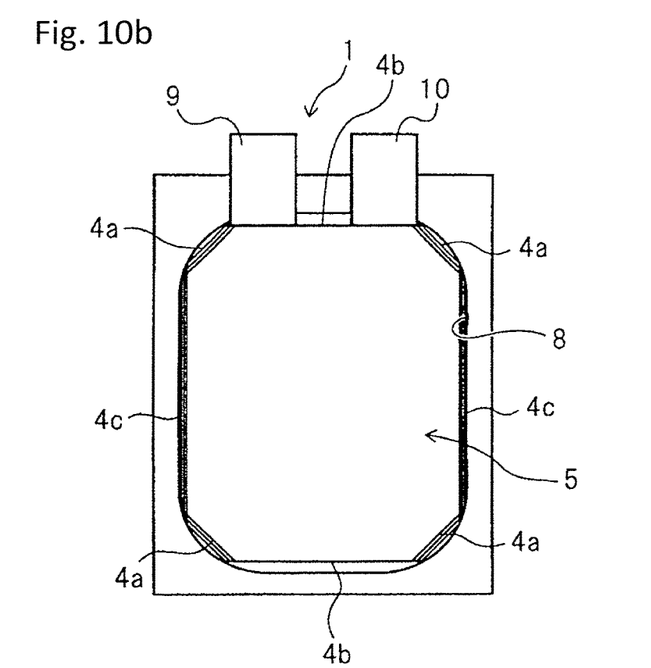
FIG. 10b is a plan view schematically illustrating a state where an outer peripheral portion of the battery electrode assembly of the secondary battery illustrated in FIG. 10a is folded to be contained in an emboss portion.

FIGS. 10a and 10b each illustrate a secondary battery of a third exemplary embodiment of the present invention. In this exemplary embodiment, as illustrated in FIG. 10a, four corners 4a of battery electrode assembly 5 protrude to the outside of emboss portion 8, and furthermore, battery electrode assembly 5 protrudes to the outside of emboss portion 8 in the direction orthogonal to the longitudinal direction (horizontal direction in FIGS. 9a and 9b). That is, lateral two sides 4b of battery electrode assembly 5 are longer than the lateral length of emboss portion 8. However, longitudinal two sides 4c of battery electrode assembly 5 are shorter than the longitudinal length of emboss portion 8. In this configuration, as illustrated in FIG. 10b, in addition to four corners 4a, longitudinal two sides 4c are also folded to be inserted into emboss portion 8. However, gaps exist between lateral sides 4b and an inner peripheral portion of emboss portion 8, and therefore electrolyte can be satisfactorily injected and held with the gaps. The effect of preventing movement of battery electrode assembly 5 (particularly, in the lateral direction) is high. As in the case of the first exemplary embodiment, positive electrodes 2 and negative electrodes 3 are preferably small enough not to protrude to the outside of emboss portion 8.

[Modification]

Also in the second and third exemplary embodiments, a modification similar to the modification of the first exemplary embodiment is considered. That is, while four corners 4a of each separator 4 of battery electrode assembly 5 and two sides 4b or 4c are not folded, and four corners 4a and two sides 4b or 4c protrude to the outside of emboss portion 8, four corners 4a and two sides 4b or 4c are inserted between flexible films 7 outside emboss portion 8, as illustrated in FIG. 9a or FIG. 10a. When flexible films 7 are bonded, four corners 4a and two sides 4b or 4c are also fixed, and therefore battery electrode assembly 5 is fixed so that it cannot move.

Figure 11:
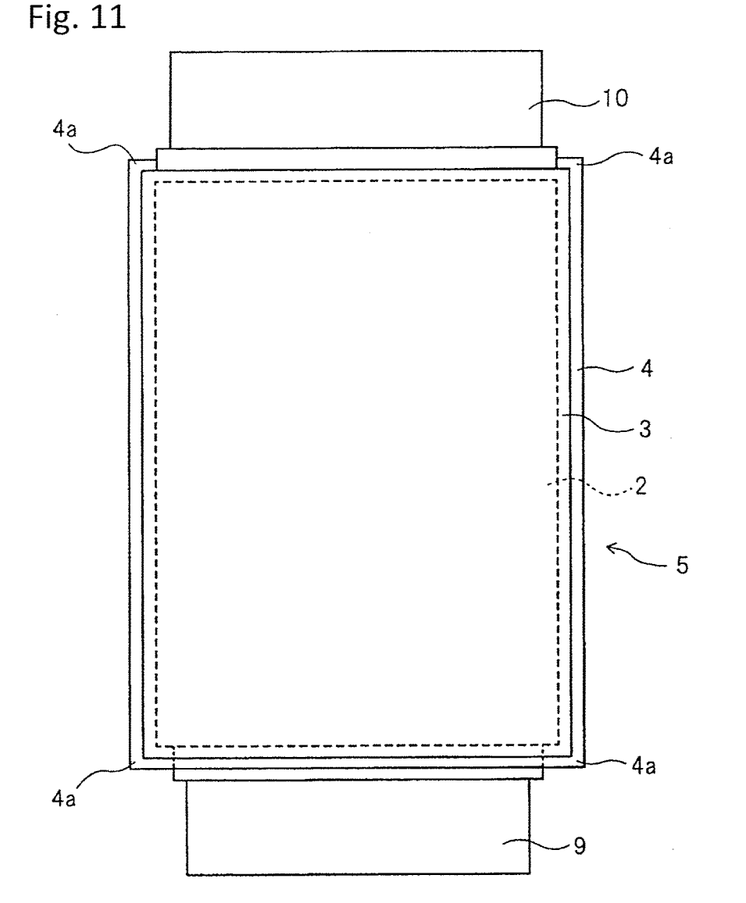
FIG. 11 is a plan view illustrating another example of the battery electrode assembly of the secondary battery.
Figure 12:
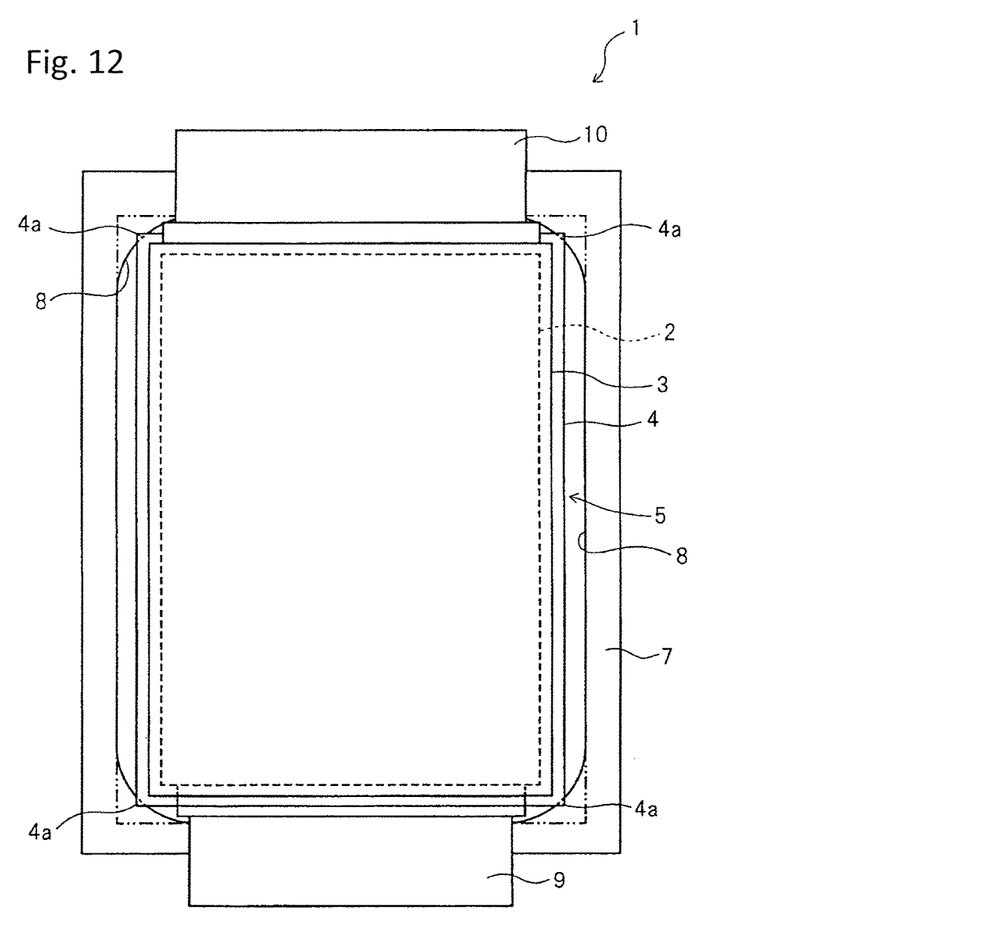
FIG. 12 is a plan view of the secondary battery according to the first exemplary embodiment of the present invention, using a battery electrode assembly illustrated in FIG. 11.

Battery electrode assembly 5 illustrated in each of FIGS. 1 to 10b has a configuration in which positive electrode terminal 9 and negative electrode terminal 10 protrude from the same side. However, as illustrated in FIG. 11, positive electrode terminal 9 and negative electrode terminal 10 may extend from respective opposite sides. Also in a case where battery electrode assembly 5 having such a configuration is used, for example, as illustrated in FIG. 12, only four corners 4a of battery electrode assembly 5 protrude to the outside of the emboss portion, so that four corners 4a are folded to be pushed inside emboss portion 8, or are not folded, and inserted between flexible films 7, thereby exerting the above effect. Additionally, in the second and third exemplary embodiments illustrated in FIGS. 9a, 9b, 10a and 10b, battery electrode assembly 5 having a configuration illustrated in FIG. 11 may be used. Even in this case, an effect which is substantially the same as the above effect is obtained.

Thus, while the present invention is described with reference to several exemplary embodiments, the present invention is not limited to the configurations of the above exemplary embodiments, various changes understood by a person skilled in the art can be applied to the configuration and details of the present invention within the scope of the technology of the present invention.

The present application claims priority over Japanese patent application No. 2014-71718 filed on Mar. 31, 2014, and the entire disclosure of Japanese patent application No. 2014-71718 is herein incorporated.

The invention claimed is:

1. A secondary battery comprising:
   a battery electrode assembly that has a quadrangular planar shape, and includes a positive electrode and a negative electrode laminated with a separator interposed therebetween; and
   an exterior container that is formed of flexible films, and contains said battery electrode assembly, wherein
   said exterior container has a recessed emboss portion that contains said battery electrode assembly therein,
   four corners of an outer peripheral portion of said battery electrode assembly are either folded to be contained inside said emboss portion, or inserted between said flexible films outside said emboss portion,
   a length of at least one side among four sides forming the quadrangular planar shape of said battery electrode assembly is shorter than an inner dimension of said emboss portion in a direction in which the one side extends, and
   said four corners of said battery electrode assembly have such size so as to protrude to the outside of said emboss portion in plan view in a state before being contained in said emboss portion in a direction in which the four corners are contained in said emboss portion.

2. The secondary battery according to claim 1, wherein lengths of two sides opposite to each other among the four sides forming the quadrangular planar shape of said battery electrode assembly each are shorter than an inner dimension of said emboss portion in a direction in which the two sides extend, and lengths of other two sides each are shorter than an inner dimension of said emboss portion in a direction in which the other two sides extend.

3. The secondary battery according to claim 2, wherein at least respective active material layers of said positive electrode and said negative electrode each have such a size so as not to protrude to the outside of said emboss portion in plan view.

4. The secondary battery according to claim 1, wherein lengths of two sides opposite to each other among the four sides forming the quadrangular planar shape of said battery electrode assembly each are shorter than an inner dimension of said emboss portion in a direction in which the two sides extend, and lengths of other two sides each are longer than an inner dimension of said emboss portion in a direction in which the other two sides extend.

5. The secondary battery according to claim 4, wherein at least respective active material layers of said positive electrode and said negative electrode each have such size so as not to protrude to outside of said emboss portion in plan view.

6. The secondary battery according to claim 1, wherein at least respective active material layers of said positive electrode and said negative electrode each have such a size so as not to protrude to the outside of said emboss portion in plan view.

* * * * *